US010359759B2

(12) United States Patent
Geweth et al.

(10) Patent No.: US 10,359,759 B2
(45) Date of Patent: Jul. 23, 2019

(54) METHOD FOR OPERATING A MOTION CONTROL SYSTEM AND MOTION CONTROL SYSTEM OPERATING ACCORDING TO THE METHOD AS WELL AS COMPUTER PROGRAM FOR IMPLEMENTING THE METHOD

(71) Applicant: Siemens Aktiengesellschaft, München (DE)

(72) Inventors: Daniel Geweth, Ranstadt (DE); Dirk Mattil, Erlangen (DE); Björn Seelinger, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 246 days.

(21) Appl. No.: 14/567,673

(22) Filed: Dec. 11, 2014

(65) Prior Publication Data

US 2015/0168940 A1 Jun. 18, 2015

(30) Foreign Application Priority Data

Dec. 12, 2013 (EP) .................................... 13196906

(51) Int. Cl.
*G05B 19/19* (2006.01)
*G05B 19/4103* (2006.01)
(52) U.S. Cl.
CPC ......... *G05B 19/19* (2013.01); *G05B 19/4103* (2013.01); *G05B 2219/50047* (2013.01); *G05B 2219/50233* (2013.01); *G05B 2219/50234* (2013.01)

(58) Field of Classification Search
CPC ................ G05B 19/19; G05B 19/4103; G05B 2219/50047; G05B 2219/50233; G05B 2219/50234
See application file for complete search history.

(56) References Cited

U.S. PATENT DOCUMENTS

| 5,904,745 | A | | 5/1999 | Nafziger et al. |
| 5,953,233 | A | * | 9/1999 | Higasayama ...... G05B 19/4097 318/573 |
| 2002/0153451 | A1 | * | 10/2002 | Kiss ..................... B64C 27/001 244/17.27 |
| 2003/0078692 | A1 | | 4/2003 | Heber et al. |
| 2007/0085850 | A1 | | 4/2007 | Hong et al. |
| 2008/0188953 | A1 | | 8/2008 | Korajda et al. |
| 2009/0088891 | A1 | | 4/2009 | Birzer et al. |

(Continued)

FOREIGN PATENT DOCUMENTS

| CN | 1205310 A | 1/1999 |
| CN | 101180591 A | 5/2008 |

(Continued)

OTHER PUBLICATIONS

Konincks et al., "Real-Time NURBS interpolator for Distributed Motion Control", 2002, CIRP Annals, vol. 51, Issue 1, pp. 315-318 (Year: 2002).*

(Continued)

*Primary Examiner* — Jason Lin
(74) *Attorney, Agent, or Firm* — Henry M. Feiereisen LLC

(57) ABSTRACT

A motion control system operating a machine as well as a method operating a machine scale a motion path section-by-section by using a $C^2$-consistent scaling function.

12 Claims, 5 Drawing Sheets

(56) References Cited

U.S. PATENT DOCUMENTS

2009/0160504 A1   6/2009 Miller
2010/0008754 A1   1/2010 Hartmann et al.

FOREIGN PATENT DOCUMENTS

| CN | 101194212 A | 6/2008 |
| CN | 101290515 A | 10/2008 |
| EP | 1220069 A1 | 4/2003 |
| EP | 1659464 | 5/2006 |
| EP | 2144127 A1 | 1/2010 |

OTHER PUBLICATIONS

European search Report issued by the European Patent Office dated May 8, 2014 in counterpart European patent Application No. EP 13 19 6906.
Guang Y: "Optimale Steuerung der Bewegung und der Geschwindigkeit für das drei- und fünfachsige Fräsen", in: Dissertation ETH No. 11430, 1996.

* cited by examiner

METHOD FOR OPERATING A MOTION CONTROL SYSTEM AND MOTION CONTROL SYSTEM OPERATING ACCORDING TO THE METHOD AS WELL AS COMPUTER PROGRAM FOR IMPLEMENTING THE METHOD

CROSS-REFERENCES TO RELATED APPLICATIONS

This application claims the priority of European Patent Application, Serial No. EP13196906, filed Dec. 12, 2013, pursuant to 35 U.S.C. 119(a)-(d), the content of which is incorporated herein by reference in its entirety as when fully set forth herein.

BACKGROUND OF THE INVENTION

The invention relates to a method for operating a motion control system. The invention further relates to an apparatus for implementing the method, i.e. a motion control system operating according to the method, and to a computer program for implementing the method and to a computer program product, such as a data carrier, upon which such a computer program is stored.

The following discussion of related art is provided to assist the reader in understanding the advantages of the invention, and is not to be construed as an admission that this related art is prior art to this invention.

The specialist term "motion control system" is to be understood as representing an apparatus for the coordinated control and/or monitoring of axes, for example axes of a production or processing machine (machine). When a number of axes are coupled, the term "electronic synchronized system", or "synchronized system" for short, is also used. Any motion control application with which the transportation, examination and processing or working of materials takes place is considered to be a machine.

With this type of machine, a target value of the axes is frequently formed by way of a synchronized system or by way of other master values (position or time).

Motion control systems of the aforementioned type offer special functions therefor, for example so-called electronic cam mechanisms (VDI2143), whereby the frequently non-linear association between master value and slave value is defined by way of so-called cam disks. In this way there is also the possibility to scale such electronic cam disks and the like across their slave value range (vertical axis) and master value range (horizontal axis). This is nevertheless a linear scaling. With the required $C^2$ consistency, on account of the resulting inconsistencies in the derivations, a linear section-by-section scaling can however only be used in so-called locking sections (VDI2143) when the slave value of the cam disk does not change and thus the slave axis exists.

It would therefore be desirable and advantageous to obviate prior art shortcomings and to provide an improved possibility of scaling the respective slave and master value ranges. Applications include predefining an offset angle in drive and curve synchronizations, a print mark correction or an adjustment of synchronous motions of a number of axes.

SUMMARY OF THE INVENTION

According to one aspect of the invention, a method for operating a motion control system, in particular for the coordinated control and/or monitoring of at least one master value and one slave value, includes scaling section-by-section a motion path with a $C^2$-continuous scaling function. The aim of the scaling by means of such a scaling function consists in not negatively impacting an existing $C^2$-continuous in the synchronized system by means of scaling.

According to another aspect of the invention, a motion control system includes a processing unit for executing the method. The apparatus or motion control system includes means for implementing the method. According to yet another aspect of the invention, a computer program for carrying out the method includes a computer program that includes non-transitory program code instructions that are stored in a storage device and can be executed by a computer.

The invention is based here on the knowledge that a $C^2$-continuous scaling function can be achieved, by the scaling region being defined by way of so-called Bezier splines, namely 4th-order Bezier splines. The gradients and curvatures of the Bezier splines are predetermined by way of weighting points (weights). The weighting points are determined in accordance with the known spline algorithms (for instance: Numerik-Algorithmen [Numerical Algorithms], Springer Verlag ISBN 3-540-62669-7). A monotonic characteristic of the Bezier splines is achieved with a homogeneous curvature distribution by suitably selecting the weighting points.

According to an advantageous feature of the present invention, the weighting points of a polygon that include the $C^2$-consistent function and define the characteristic thereof are determined, thus ensuring a monotonic characteristic of the $C^2$-consistent scaling function and a homogeneous curvature distribution along the $C^2$-consistent scaling function.

According to another advantageous feature of the present invention, the characteristic of the cam disk of the synchronized system may be extended or compressed section-by-section in a $C^2$-continuous manner on account of the $C^2$-continuous of the scaling function irrespective of the transmission function of the synchronized system in the complete master and slave region.

Applications for the exemplary embodiments described herein that involve the section-by-section extension or compression of axes coordinated in a synchronized system (partial non-linear scaling) include the predefinition of an offset angle, a print mark correction and a synchronous motion of a number of axes.

One concrete example relates to quality assurance in continuously running machines, and specifically the predefinition of an offset angle between a first axis (master) and a second axis (slave). Here each n-th product of a continuously running process is checked by way of a mechanism. After a predeterminable number of products, the location of quality assurance is to be changed. This would be possible for instance by predefining a superimposed offset. When this offset is moved by a superimposed positioning, this nevertheless results in the disadvantage that there is no fixed coupling between master and slave at the point in time of the compensating movement. When the master is stopped at this point in time (e.g. in the event of an emergency shutdown), this may result in the slave running backward. This is however not permissible in many machines.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 shows a characteristic of recorded curves, similar to those in FIG. 2, when using a $C^2$-continuous scaling function and.

DETAILED DESCRIPTION OF PREFERRED EMBODIMENTS

Figure 1:
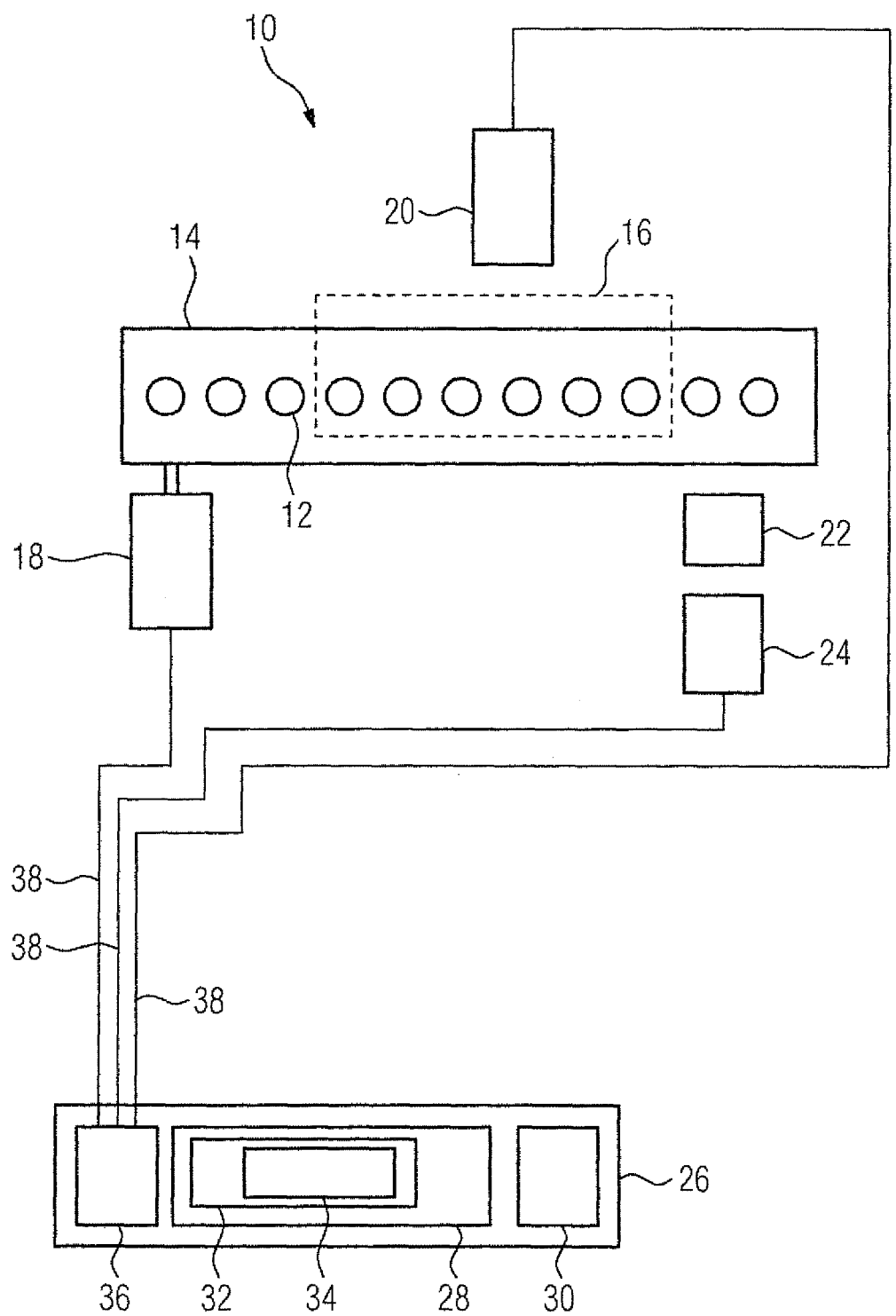
FIG. 1 shows a production machine, which is taken into consideration for a controller according to a method as described here and has a corresponding drive or motion control system corresponding hereto.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified schematic diagram of a production machine 10 for filling bottles 12 as an example of a processing machine or a machine tool 10. The approach proposed here is naturally taken into consideration for production machines 10 of varying types and is not restricted in any way to the exemplary embodiment described below.

The production machine 10 shown in FIG. 1 includes a conveyor belt 14, upon which the bottles 12 to be filled are located. The bottles 12 are transported to a filling facility 16 by way of the conveyor belt 14, said filling facility moving partly in synchrony with the conveyor belt 14 when the bottles 12 are filled. For this the production machine 10 includes drives, namely at least one first drive 18 for the conveyor belt 14 and a second drive 20 for moving the filling facility 16. A camera 22 or the like is provided for quality control. The camera 22 is moved using its own drive, here a third drive 24, at least partly in synchrony with the bottles 12 on the conveyor belt 14, in order to acquire an image of in each instance one bottle 12. Within the scope of quality control, it is not every individual bottle 12 which is examined, but instead it is sufficient when an image is acquired of each n-th bottle by means of the camera 22, with the image being evaluated in a known manner for quality control purposes.

The position of the conveyor belt 14 determines the position of the filling facility 16 and the position of the camera 22. In accordance with conventional terminology, the conveyor belt 14 is accordingly referred to as the master. The filling facility 16 and the camera 22 are accordingly slaves, since their motion or position is dependent on the motion/position of the master (conveyor belt 14). The terms master and slave are also used below for the respective drives 18, 20, 24. The master and the or each slave of a production machine 10 represent a degree of freedom of the production machine 10 which is usually also referred to as an axis.

A motion control system 26 is provided in a manner known per se to control and monitor the production machine 10. This includes a memory 28 and at least one processing unit 30 in the form of or in the manner of a microprocessor. A computer program functioning as a control program 32 is loaded into the memory 28, said computer program being executed by the respective processing unit 30 during operation of the motion control system 26. The control program 32 includes to this end a software implementation of one or more control algorithms 34 for actuating the drives 18, 20, 24. By controlling the control program 32, output signals 38 for actuating the respective drive 18, 20, 24 are output here by way of a drive regulating unit 36.

Figure 2:
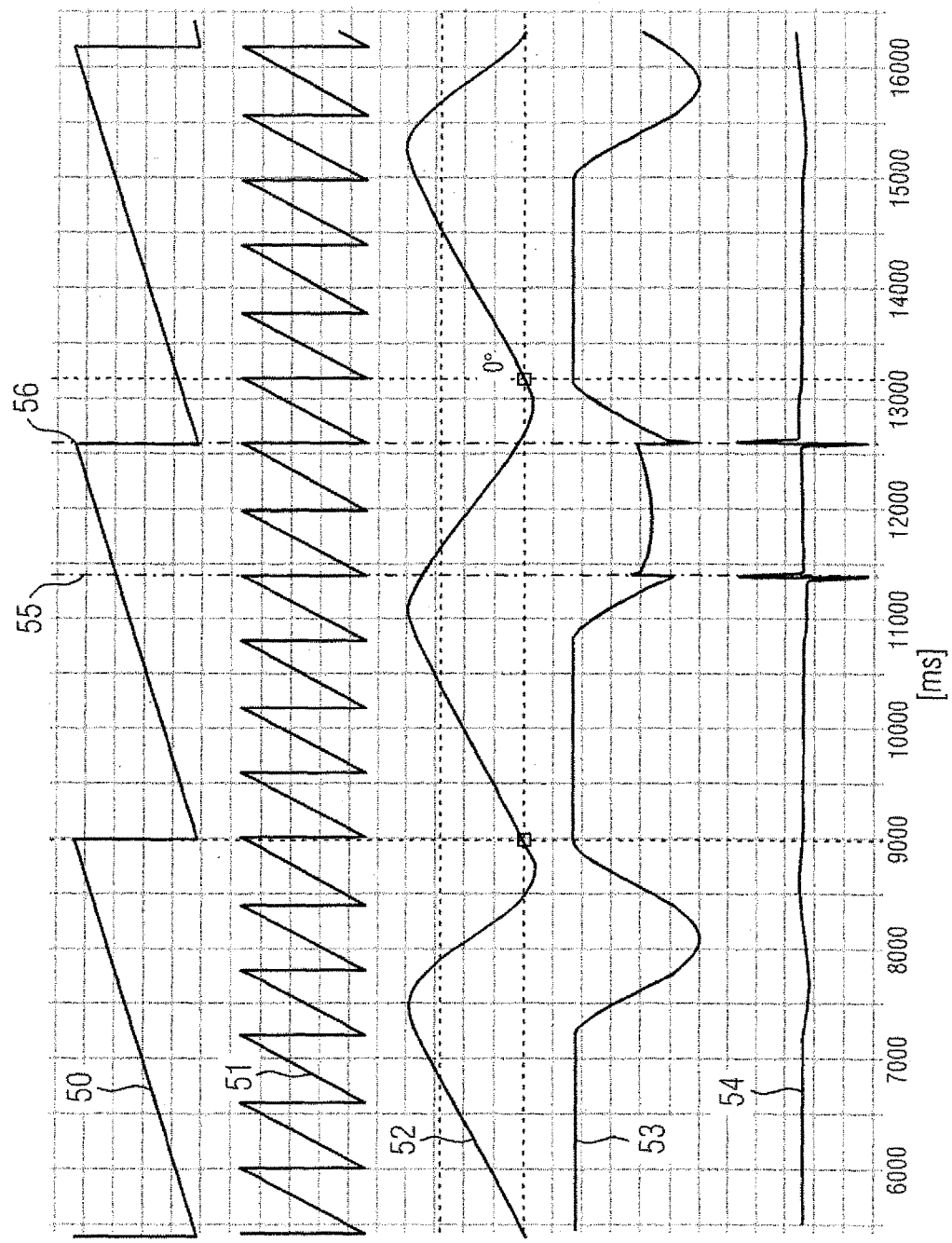
FIG. 2 shows a characteristic of recorded curves relating to the exemplary embodiment of the present invention according to FIG. 1.

The representation in FIG. 2 indicates a characteristic of individual characteristic curves in this example. The uppermost curve 50 indicates a position characteristic of the master and a master cycle which repeats regularly. Such a master cycle relates for instance to a specific number of bottles 12, which are moved in a master cycle respectively, for instance to the filling facility 16, and to a motion of the bottles 12 during filling by the filling facility 16. A second curve 51 is shown below the master cycle, said curve illustrating that the master cycle can be divided into individual segments. The second curve 51 therefore shows the position characteristic of the master which is subdivided into the spacing between the bottles. The motion and the position of individual bottles 12 can be detected in this way for instance.

Below this the third curve 52 from the top shows an example of a motion of a slave in relation to the master cycle, and the motion illustrated here involves the motion of the camera 22 mentioned in FIG. 1, in other words the position characteristic of the third axis. In the first third of the representation of this curve in FIG. 2 (seen from left to right), a situation is shown in which the slave in the master cycle is firstly moved at constant speed, in order in this way to achieve a suitable relative position with respect to a bottle 12 moving on the conveyor belt 14, at a specific point in time, so that a camera image can be recorded hereof. The slave (the camera 22) is subsequently moved into its starting position and the same motion of the slave (the camera 22) takes place in the next master cycle.

In the middle third of the representation, a situation is shown such as occurs when, during continuously occurring master cycles, an offset is changed between the master (conveyor belt 14) and the slave (camera 22), in order for instance to quality-control not each sixth bottle 12 in a group of bottles 12 moved during the master cycle, but instead to examine each seventh bottle 12 in the same group. During a master cycle, the motion of the slave must then be scaled in order to arrive at the position of the bottle 12 which is now relevant in the bottle group and to implement a synchronous motion with the motion of the conveyor belt 14 during the recording of the camera image. The scaled region (scaling region) is found in the afore-cited middle third of the representation, said scaled region being limited in order to highlight a vertical line referred to in the representation on the one hand by 55, which represents the start of the scaling region, and a further vertical line referred to by 56, which represents the end of the scaling region.

With the two curves 53, 54 shown below the motion path of the slave (position characteristic of the third axis 52), a curve 53 is namely visible for the speed characteristic of the third axis and a curve 54 for the acceleration characteristic of the third axis, such that a linear scaling results in inconsistencies in the speed characteristic and pulse-type peaks occur in the acceleration characteristic. This puts at least the affected drive 24 under strain and also the production machine 10 as a whole.

Figure 3:
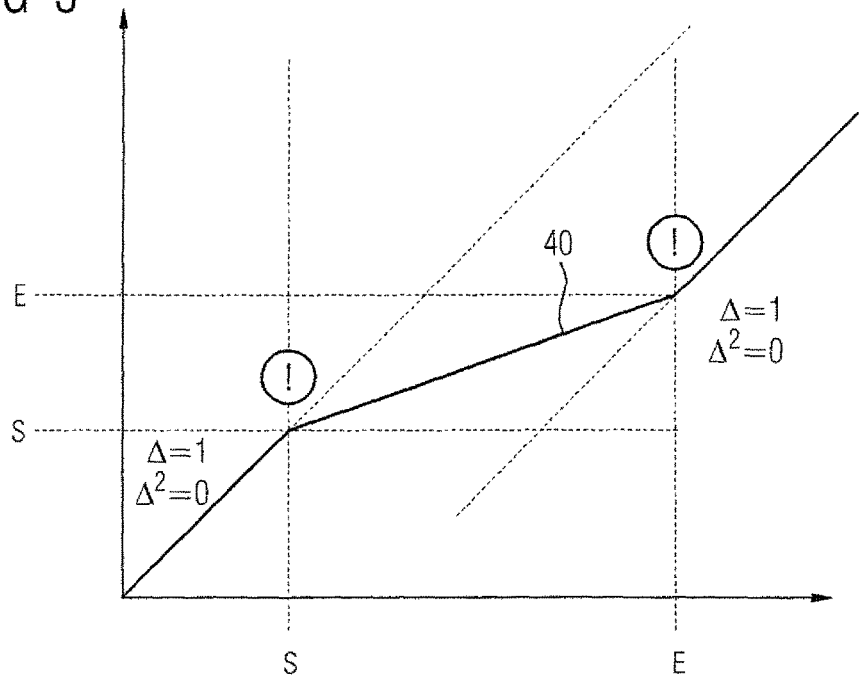
FIG. 3 shows a linear scaling function.

The representation in FIG. 3 shows a scaling function 40 for a linear scaling. This scaling function 40 can explain why the inconsistencies in speed and acceleration of a scaled motion of an axis described by way of example with the aid of FIG. 2 occur in a linear scaling for instance.

FIG. 3 shows the master region of the master axis on the horizontal axis (the conveyor belt 14, in the situation shown in FIG. 1). The scaled master value is plotted accordingly on the vertical axis. This is used as a master value for the cam disk. The scaling takes place between a starting point referred to with "S" and an end point referred to with "E", and it is immediately identifiable in the representation that on account of the linear scaling at the two locations identified respectively with an exclamation mark (!), an inconsistency is produced in the derivation of the scaling function 40, which results in inconsistencies in the speed characteristic and acceleration characteristic of the resulting motion path (see FIG. 2).

For the regions before and after the scaled region, in other words between the starting point "S" and the end point "Δ", the gradient Δ of the scaling function 40 and the curvature $\Delta^2$ of the scaling function 40 is specified by $\Delta=1$ and $\Delta^2=0$ respectively. A gradient $\Delta=1$ means that the master value is not scaled in this region. A curvature $\Delta^2=0$ means that on account of the underlying scaling function no change in the speed and acceleration resulting from the cam disk takes place in the corresponding segment of the scaling function 40 when moving the master and the slave along the respective motion path.

The inconsistency of the scaling function 40 associated with the linear scaling results, at the transition points, also referred to below as inconsistency points, from unscaled region to scaled region and from scaled region to unscaled region, in a sudden change in the first derivation of the scaled master value (here the manipulated master value of the cam disk), the speed and accordingly in an abrupt change in the second derivation of the slave value, the acceleration.

Such sudden changes in the speed are unfavorable for the relevant units, in other words the respective drive 24 and the subsequent mechanism, so that a linear section-by-section scaling was previously only possible in so-called locking sections on account of the resulting inconsistencies. Accordingly a scaling of the value range of the master was therefore for instance possible wherever the slave executes no motion, in other words is at a standstill. This is referred to as a locking position.

In order to prevent such inconsistencies and thus the associated sudden changes in speed and abrupt changes in acceleration, provision is made in accordance with the approach presented here to extend or compress the region to be scaled by means of a monotonic and $C^2$-continuous function. A $C^2$-continuous function here is a function whose first and second derivation is continuous. On account of the $C^2$-continuous, a resulting, scaled section can be coupled in a continuous-acceleration fashion to the sections of the motion which are upstream and downstream of the scaled region and which result after the scaling with such a scaling function 42, and is coupled in a continuous-acceleration fashion in the resulting motion. A continuous-acceleration coupling ability and a continuous-acceleration coupling means that the acceleration (and also the underlying speed), upon transition from the unsealed region to the scaled region and subsequently from the scaled region to the unsealed region, only changes consistently and not suddenly.

Figure 4:
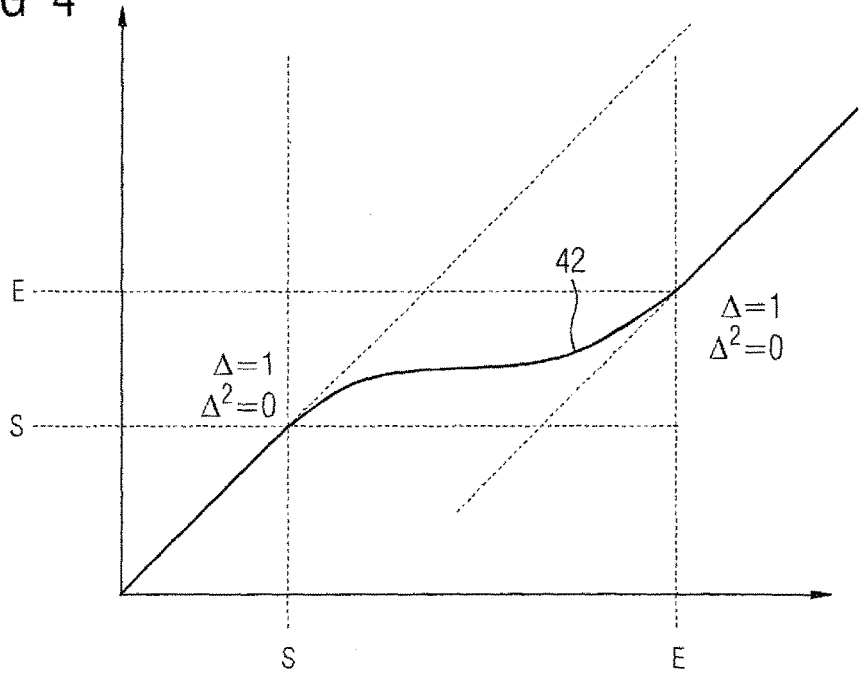
FIG. 4 shows a scaling function of the type proposed here, namely a $C^2$-continuous scaling function.

A scaling function 42 which can be used for such a scaling of a cam disk is shown by way of example in FIG. 4. The representation in FIG. 4 is based on the representation in FIG. 3, so that reference is made to the embodiments there, and a scaling with a $C^2$-continuous function is now shown between the start and end points (S, E) of the scaled region, contrary to the linear scaling in FIG. 3. On account of such a scaling with a $C^2$-continuous function, at the start point (S) and the end point (E) of the scaled region, the aforementioned continuous-acceleration coupling of a motion path to the unsealed sections of the motion path results and between the start and end point (S, E), the scaled characteristic of the resulting motion path is just as consistent as the underlying scaling function 42 and is also consistent in the first and second derivation, so that the speed and acceleration also only change here continuously and not suddenly.

Figure 5:
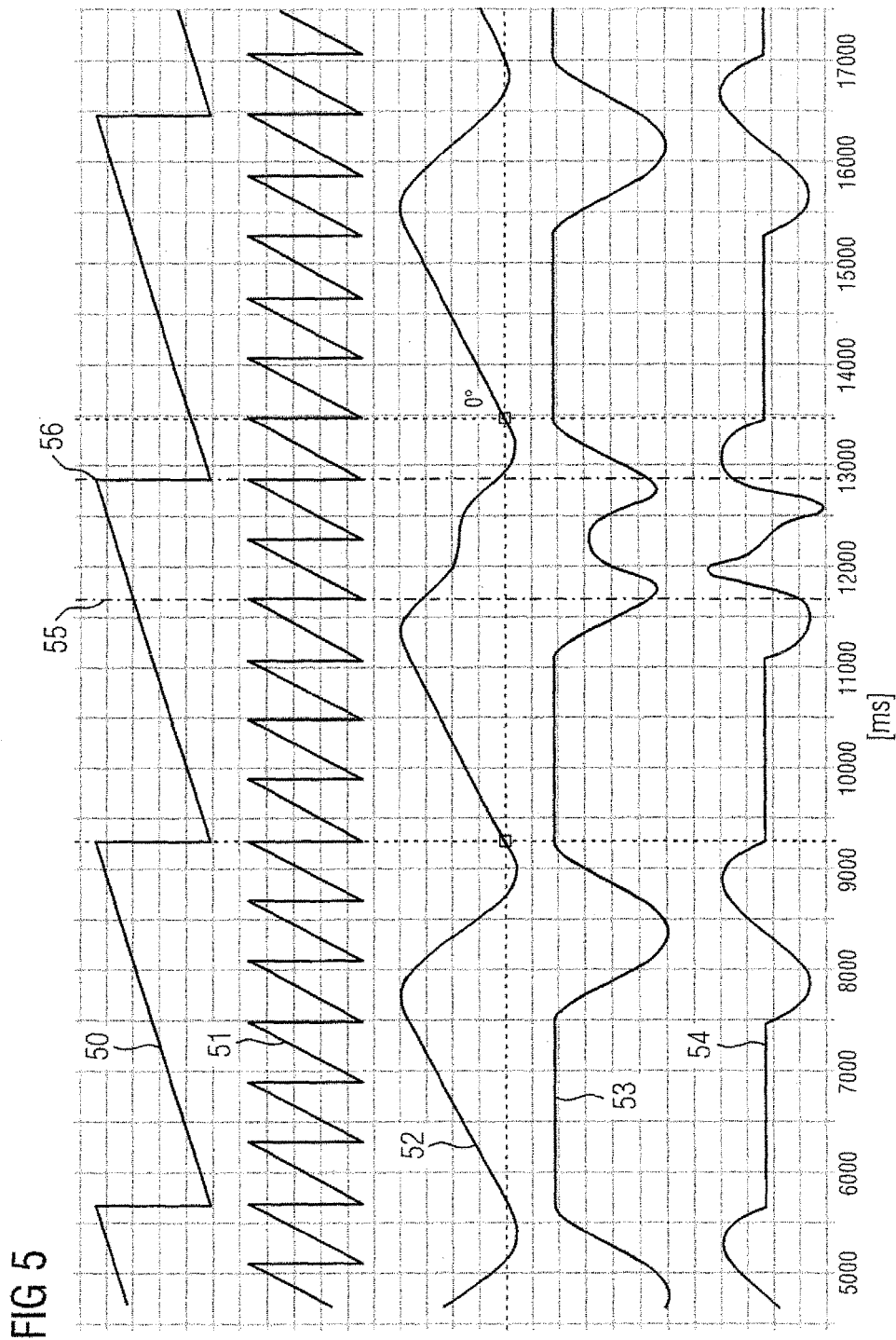

The result of such a scaling with a $C^2$-continuous scaling function 42 (FIG. 4) is shown in the representation in FIG. 5, wherein the representation of the acceleration characteristic 54 of the third axis is visible in particular as a qualitative representation with a scaling of the vertical axis which differs in comparison with the representation in FIG. 2. A scaling of the motion of the third axis, in other words the slave axis, takes place here in the second master cycle shown entirely, in other words between vertical lines 55, 56 representing the start and the end of the scaling region. The scaling is based in this case, contrary to the scaling shown in FIG. 2, not on a linear scaling function 40 (FIG. 3), but on a $C^2$-continuous scaling function 42, as shown in FIG. 4. By comparison with the representation in FIG. 2, the difference in the resulting speed characteristic and acceleration characteristic 53, 54 is visible. Accordingly the scaling with a $C^2$-continuous scaling function 42 prevents inconsistencies in the speed characteristic 53 of the third axis and in the acceleration characteristic 54 of the third axis.

Here a 4th-degree Bezier spline functions as the basis of the $C^2$-continuous scaling function 42. Such splines and their definition or mathematical basis, in particular the determination of the respective coefficients, are known per se, so that it is possible here to dispense with corresponding explanations. The use of the spline algorithm which is likewise known per se determines the weighting points required to predetermine desired gradients and curvatures. These are selected such that a monotonic characteristic of the spline results with a homogeneous curvature distribution. An algorithm for determining the coefficients and the weighting points of such a $C^2$-continuous function is implemented in the exemplary embodiment shown using software, and is for instance an integral part of the control program 32 loaded into the memory 28 of the motion control system 26.

Figure 6:
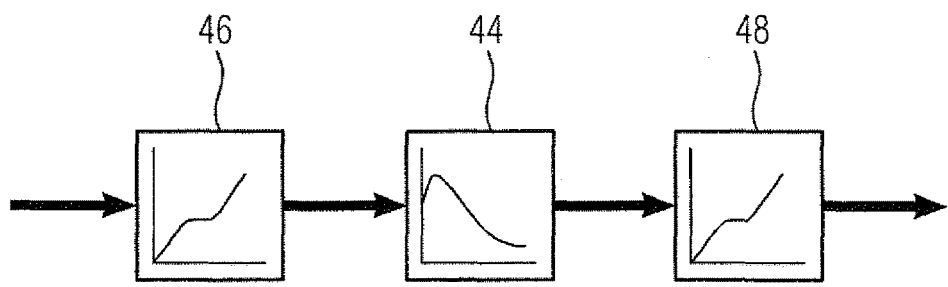
FIG. 6 shows a block diagram with possible sites for the use of a functionality to realize the scaling proposed here.

The representation in FIG. 6 shows in a schematic and simplified manner that the $C^2$-continuous scaling with a $C^2$-continuous scaling function 42 can be applied both to the definition range and also to the value range of a function 44 to be scaled in each instance. The function 44 to be scaled is shown symbolically in the center in the block diagram. This is a cam disk for instance. An underlying polynomial table is stored for instance as the control algorithm 34 and as a parameterization of the control algorithm 34 in the memory 28 of the motion control system 26.

The master value of such a cam disk can be $C^2$-continuously scaled. A scaling function block 46 herefor is shown on an input side of the cam disk 44 to be scaled. The scaling function block 46 is a functionality implemented here using software, for determining a $C^2$-continuous scaling function 42 for the section-by-section non-linear scaling of the region selected for scaling purposes in each instance (see e.g. FIG. 4 and there the region between the starting point S and the end point E) and is thus likewise an integral part of the control program 32 loaded into the memory 28 of the motion control system 26. The scaling function block 46 realizes the afore-described section-by-section scaling of the master value using a monotonic $C^2$-continuous scaling function 42, so that the region to be scaled is extended or compressed. The $C^2$-continuous scaling may relate in addition or alternatively also to the slave region of a curve 44 to be scaled in each instance. In this respect, a scaling function block 48 arranged downstream of the curve 44 to be scaled is also shown in FIG. 6. The input-side $C^2$-continuous scaling of the cam disk 44 (scaling function block 46) brings about a scaling of the motion information of the master value (horizontal axis of the cam disk 44 is scaled). The output-side $C^2$-continuous scaling of the cam disk 44 (scaling function block 48) brings about a scaling of the motion information of the slave value (horizontal axis of the cam disk 44 is scaled).

The representation in FIG. 6 thus shows that the master value can be manipulated via a $C^2$-continuous scaling function 42, as shown in FIG. 4, in other words for instance a first $C^2$-continuous scaling function 42 realized with the input-side scaling function block 46. This manipulated master value is fed to the cam disk 44. The motion characteristic (slave unsealed) resulting therefrom can be manipulated via a second $C^2$-continuous scaling function 42 realized with the output-side scaling function block 48. The slave value resulting therefrom can then be fed to the third drive 24 for instance.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a motion control system of a machine having coupled master and slave axes, comprising:
   selecting a section of an existing motion path of the machine to be scaled;
   scaling the selected motion path section by using a $C^2$-continuous scaling function;
   determining with a spline algorithm corner points of a polygon which include the $C^2$-continuous scaling function and determine a course of the $C^2$-continuous scaling function, with the corner points ensuring a monotonic course of the $C^2$-continuous scaling function and a homogeneous curvature distribution along the $C^2$-continuous scaling function; and
   operating the motion control system of the machine based on the scaling of the motion path.

2. The method of claim 1, wherein the scaled motion path section is extended.

3. The method of claim 1, wherein the scaled motion path section is compressed.

4. The method of claim 1, wherein the motion path section of the slave axis is scaled.

5. The method of claim 1, wherein the motion path section of the master axis is scaled.

6. A computer program comprising program code stored on a non-transitory storage device, wherein the computer program when executed on a control device of a motion control system of a machine having coupled master and slave axes, selects a section of an existing motion path of the machine to be scaled, scales the selected motion path section by using a $C^2$-continuous scaling function, determines with a spline algorithm corner points of a polygon which include the $C^2$-continuous scaling function and determine a course of the $C^2$-continuous scaling function, with the corner points ensuring a monotonic course of the $C^2$-continuous scaling function and a homogeneous curvature distribution along the $C^2$-continuous scaling function; and operates the motion control system of the machine based on the scaling of the motion path.

7. A computer program product comprising program code stored on a non-transitory computer-readable data carrier, wherein the computer program when executed on a control device of a motion control system of a machine having coupled master and slave axes, selects a section of an existing motion path of the machine to be scaled, scales the selected motion path section by using a $C^2$-continuous, determines with a spline algorithm corner points of a polygon which include the $C^2$-continuous scaling function and determine a course of the $C^2$-continuous scaling function, with the corner points ensuring a monotonic course of the $C^2$-continuous scaling function and a homogeneous curvature distribution along the $C^2$-continuous scaling function; and operates the motion control system of the machine based on the scaling of the motion path.

8. A motion control system of a machine having coupled master and slave axes, comprising a processing unit and a memory, wherein a computer program when loaded into the memory and executed on the processing unit, causes the processing unit of the motion control system to select a section of an existing motion path of the machine to be scaled, scale the selected motion path section by using a $C^2$-continuous scaling function, determines with a spline algorithm corner points of a polygon which include the $C^2$-continuous scaling function and determine a course of the $C^2$-continuous scaling function, with the corner points ensuring a monotonic course of the $C^2$-continuous scaling function and a homogeneous curvature distribution along the $C^2$-continuous scaling function; and operate the motion control system of the machine based on the scaling of the motion path.

9. The motion control system of claim 8, wherein the scaled motion path section is extended.

10. The motion control system of claim 8, wherein the scaled motion path section is compressed.

11. The motion control system of claim 8, wherein the motion path section of the slave axis is scaled.

12. The motion control system of claim 8, wherein the motion path section of the master axis is scaled.

* * * * *